United States Patent Office 3,005,082
Patented Oct. 17, 1961

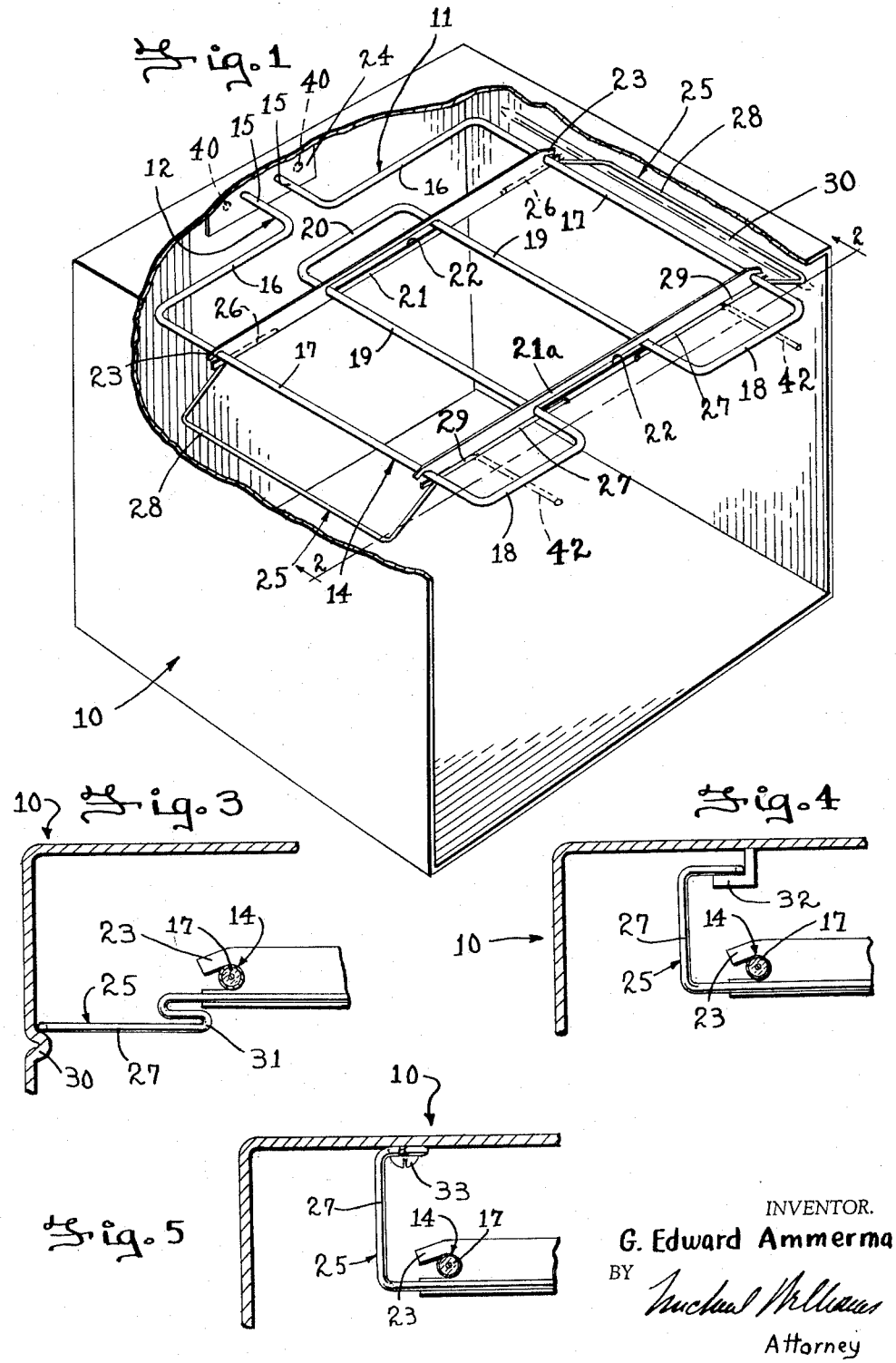

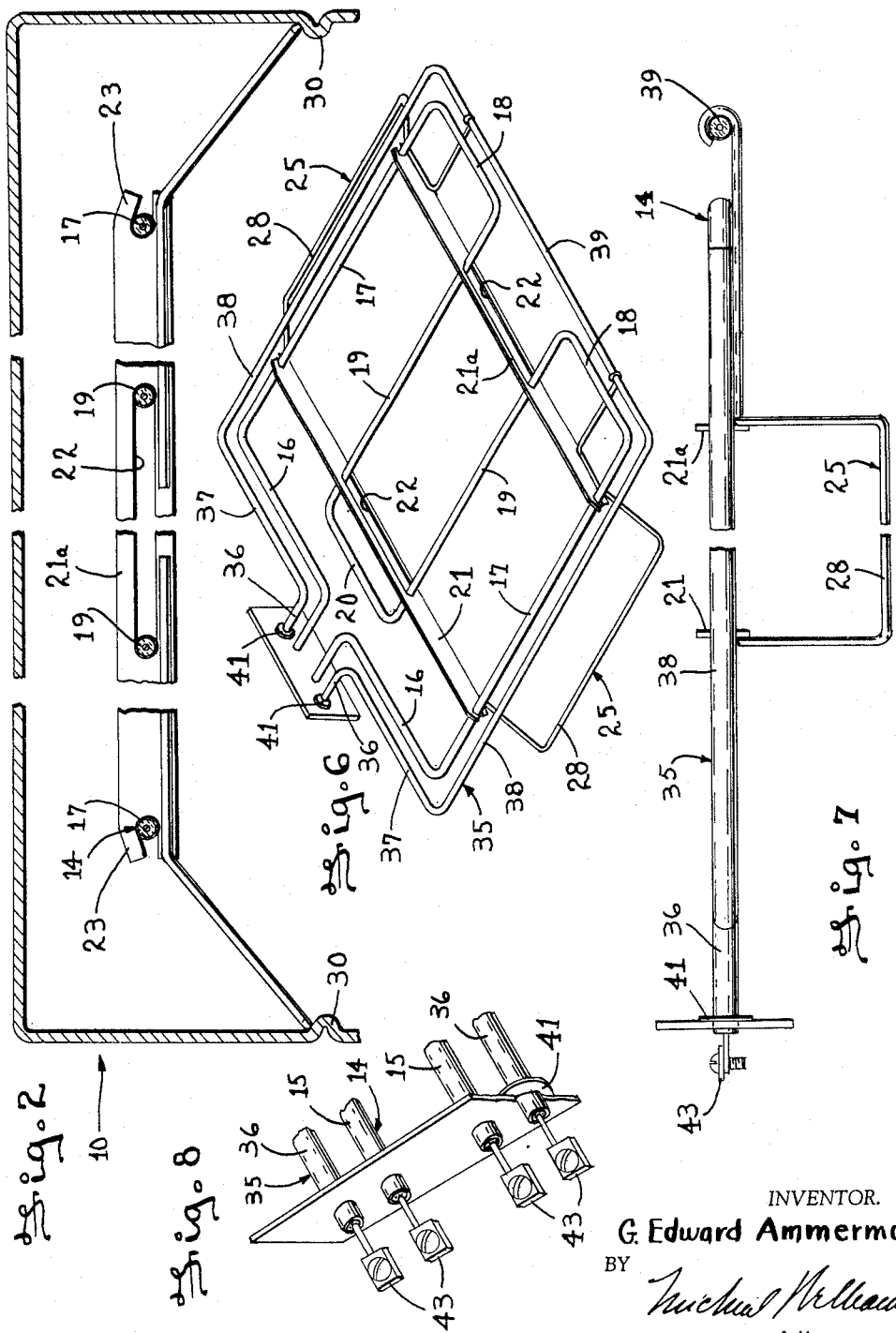

3,005,082
ELECTRIC HEATER ASSEMBLY FOR OVENS
George Edward Ammerman, Oakmont, Pa., assignor to Edwin L. Wiegand Company
Filed Apr. 28, 1958, Ser. No. 731,351
6 Claims. (Cl. 219—35)

My invention relates to electric heaters for ovens and the principal object of my invention is to provide new and improved heaters of this character.

More particularly, my invention is well adapted for use as a broiler element assembly and provides means which adapt the use of a broiler element of substantially standard design with ovens made by various manufacturers, and for replacement purposes in ovens of obsolete models.

In addition, my invention provides means whereby an auxiliary electric heater may be combined with the usual oven heater to effect better heat distribution in ovens when required.

These, and other features of the invention will be understood by a study of this specification and the drawings appended thereto.

In the drawings accompanying this specification and forming a part of this application, there is shown, for purposes of illustration, an embodiment which my invention may assume, and in these drawings:

FIGURE 1 is a broken perspective view of an oven illustrating an embodiment of my invention used for the purpose of supporting a broiler heating element, FIGURE 2 is an enlarged, fragmentary sectional view corresponding generally to the line 2—2 of FIGURE 1, FIGURES 3, 4, and 5 are broken, sectional views illustrating various other methods of supporting the heater from an oven wall, FIGURE 6 is a perspective view illustrating the embodiment of the invention when further used to support an auxiliary heating element, FIGURE 7 is a broken, side elevational view of the construction shown in FIGURE 6, and FIGURE 8 is a broken, perspective view of a supporting plate in combination with the terminals of the heaters, Referring to the drawings, the embodiment of the invention herein disclosed is adapted for use with an oven 10 of any suitable design and manufacture. The heating element 11, which may for purposes of identification be termed the main heating element, is formed with a terminal portion 12 and a loop-shaped active heating portion 14. The term "loop-shaped" as used herein is intended to cover any active heating portion having a geometrical configuration.

Thus, in the form shown in FIGURES 1 and 6, the main heating element has a pair of terminal ends 15—15, each continuing to an angular bend to merge with the active heating portion and provide oppositely extending inner portions 16—16. The latter portions have angular bends at their ends and merge with side portions 17—17 which are in spaced parallel relation. The side portions, at their forward end (that is the end nearest the opening into the oven) have angular bends which merge with outer portions 18—18. The outer portions 18—18 are generally parallel to the inner portions 16—16 and each has an angular bend to join with inwardly directed portions 19—19, and the latter portions are connected by an integral bight portion 20.

The main heating element may be of any well known form and manufactured in any desired manner. An example of a method of manufacture is disclosed in the patent to E. L. Wiegand, No. 2,376,840, issued May 22, 1954. Briefly, the heating element comprises a metallic sheath, a resistance conductor within the sheath, terminal pins at the ends of the resistance conductor, and suitable heat-conducting electrical-insulating material embedding the resistance conductor and the terminal pins. The tubular heating element is preferably filled in its straight form, as disclosed in the aforementioned patent, and is thereafter subjected to compacting forces and is then bent to the geometrical form shown in FIGURES 1 and 6.

To reenforce the active heating portion of the main heating element 11, a pair of sheet metal braces 21—21a are disposed in spaced parallel relation cross-wise of and connected to such heating portion. Preferably, the braces are identical and each has a central slot 22 to pass portions 19—19 and 20. Each end of the braces is notched to receive respective side portions 17—17 of the heating element, the legs 23 defining the notch being bent over the side portions to effect a substantially rigid assembly.

The terminal ends 15—15 of the main heating element are connected to a plate 24 for the purpose of mounting the element at this point to the rear wall of the oven. In usual construction the plate 24 is of sheet-metal, as shown in my Patent No. 2,824,944, issued February 25, 1958, and is provided with a pair of apertures to pass the terminal ends. The terminal ends may be welded to the plate 24 or, as shown in my aforesaid patent, the plate may have flanges margining the apertures, the flanges being thereafter pressed about the terminal ends.

The plate 24 is connected to the rear wall of the oven in any suitable manner, such as by a hinging action as shown in my previous patent. Since the active heating portion 14 is supported in cantilever fashion from the plate 24, it is desirable to support such portion from the oven wall.

In the disclosed embodiment, the support for the active heating portion 14 takes the form of a bendable wire member 25 connected to each of the braces 21—21a. It is presently preferred to form the wire members to generally U-shape to provide spaced legs 26—27 connected by a relatively long bight 28.

Each leg 26 is connected, as by welding, to a respective end portion of the brace 21. The legs 27 are longer than the legs 26 and have an intermediate part 29 welded to respective end portions of the brace 21a. In some instances it may be preferred to make the legs 27 the same length as the legs 26.

The bight portion 28 of the wire members 25 may be bent to any desired shape to accommodate them to a supporting surface of an oven. Thus, in FIGURE 1, the free ends of the legs 26—27 are bent to angular formation so that the distance between the bight 28—28 is equal to the distance between a pair of horizontal ribs 30 (see FIGURES 1 and 2) formed on opposite sides of the oven wall. The bights 28—28 may therefore rest on the ribs 30—30 and support the active heating portion 14.

In FIGURE 3, the legs 26—27 (only leg 27 shown) have been bent to provide a doubled-up portion 31 to decrease the distance between the opposite bights 28—28 in the event the oven is of a construction wherein the ribs 30 are closer together.

In FIGURE 4, the oven is formed with hanger members 32 depending from the top wall thereof. In this case, the legs 26—27 (only leg 27 shown) may be bent to a U-shape, as viewed from the side, so that the bight 28 and part of the adjoining leg may be hung from the hanger members.

In FIGURE 5, screws 33 secure the wire members 25 to the top oven wall. In this case, the bight 28 of each wire member may be cut away and each leg 26—27 (only leg 27 shown) may have its extremity curled to fit about the shank of the screw. It will be appreciated that formations of the wire members, other than disclosed, may be used to properly support the active heating portion 14, and such formations will largely be dictated by the type of oven construction.

In some instances it is desirable to add supplemental heat to the oven for the purpose of effecting better heat distribution therein and my invention makes it possible to add such supplemental heat at will.

Referring particularly to FIGURE 6, an auxiliary heating element 35 is assembled with the main heating element in novel arrangement. The auxiliary heating element is also preferably loop-shaped and, in this instance is formed with terminal ends 36—36 each continuing to an angular bend to merge with the active heating portion of the auxiliary heating element and provide oppositely extending, inner portions 37—37. The latter portions have angular bends at their ends and merge with side portions 38—38 which are in spaced parallel relation. The side portions, at their forward ends are integrally connected to a cross-portion 39. The auxiliary heating element may also be formed in accordance with the teachings of the aforesaid Wiegand patent.

The active heating portion of auxiliary element, as above described, is of rectangular geometrical configuration and generally circumscribes the main heating element. The auxiliary heating element is preferably connected to the plate 24 in the same manner as the main heating element. To facilitate production of a plate which may be used to support either or both of the heating elements, the plate 24 is here shown as formed with a pair of knock-out plugs indicated by the dotted lines 40—40 in FIGURE 1. These knock-out plugs may be defined by weakly connected circular portions in the plate 24 and the plugs may be easily knocked out by any suitable tool.

An abutment, such as in the form of a fixed washer 41, is provided inwardly of the free extremity of each terminal end and such extremity is disposed through a respective opening in the plate 24 (formed by removal of the knock-out plugs 40) until the washer engages the adjacent face of the plate.

The free end 42 of each leg 27 of the wire members 25 is bent angularly about the weld connection 29 and the extremity of each free end is bent about the cross-portion 39 of the auxiliary heating element 35. Thus, the washers 41 are securely held against the face of plate 24 and the assembly of the main and auxiliary heating elements is easily effected. In some cases, it may be desirable to provide separate support legs, such as the legs provided by the free ends 42 separated from the wire members 25, and in that case such separate legs may be welded to the brace 21a and the free ends 42 of wire members 25 omitted.

Terminal connection blocks 43 (see FIGURE 8) may be secured to the ends of the terminal pins extending outwardly of the sheath ends of the main and auxiliary heating elements to effect easy connection with suitable power conductors (not shown). It is preferred that the size of such connection blocks 43 be held to a minimum so that they may pass through the openings in plate 24 and consequently may be welded or otherwise mechanically and electrically secured to the terminal pins prior to final assembly of the main and/or auxiliary heating elements with the plate.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only, and that my invention is not limited thereto.

I claim:

1. A heater assembly for use in heating the interior of an oven, comprising a main sheathed tubular heating element having a terminal portion and a loop-shaped active heating portion, an auxiliary sheathed tubular heating element having a terminal portion and a loop-shaped active heating portion, the latter loop-shaped portion being greater than the former and circumscribing the same, means for supporting the terminal portions of said main and auxiliary heating elements, a pair of spaced sheet-metal braces extending cross-wise of and secured to the loop-shaped active heating portion of said main heating element, and a pair of U-shaped bendable wire members, each wire member having its legs welded to respective braces with a terminal portion of one leg of each wire member connected to the loop-shaped active heating portion of said auxiliary heating element, said wire members being bendable so that the bight portions thereof may be accommodated for engagement with different support surfaces found in various oven structures.

2. A heater assembly for use in heating the interior of an oven, comprising a main sheathed tubular heating element having a terminal portion and a loop-shaped active heating portion, an auxiliary sheathed tubular heating element having a terminal portion and a loop-shaped active heating portion, the latter loop-shaped portion being greater than the former and circumscribing the same, abutment means inwardly of the free end of the terminal portion of said auxiliary heating element, a plate member connected to the terminal portion of said main heating element and apertured to pass the terminal portion of said auxiliary heating element an amount limited by engagement with said abutment means, a pair of spaced sheet-metal braces extending cross-wise of and secured to the loop-shaped active heating portion of said main heating element, and a pair of U-shaped bendable wire members, each wire member having its legs welded to lie along respective braces and a terminal portion of one leg of each wire member being free and bent transversely of its brace and connected to the loop-shaped portion of said auxiliary heating element to oppose movement of said abutment means in a direction away from said plate member, said wire members being bendable so that the bight portions thereof may be accommodated for engagement with different support surfaces found in various oven structures.

3. A heater assembly for use in heating the interior of an oven, comprising a main sheathed tubular heating element having a terminal portion and a loop-shaped active heating portion, an auxiliary sheathed tubular heating element having a terminal portion and a loop-shaped active heating portion, abutment means inwardly of the free end of the terminal portion of said auxiliary heating element, a plate member connected to the terminal portion of said main heating element and apertured to pass the terminal portion of said auxiliary heating element an amount limited by engagement with said abutment means, and means connecting the active heating portions of said main and auxiliary heating elements and opposing movement of said abutment means in a direction away from said plate member.

4. A heater assembly for use in heating the interior of an oven, comprising a main sheathed tubular heating element having a terminal portion and a loop-shaped active heating portion, an auxiliary sheathed tubular heating element having a terminal portion and a loop-shaped active heating portion, the latter loop-shaped portion being greater than the former and circumscribing the same, abutment means inwardly of the free end of the terminal portion of said auxiliary heating element, a plate member connected to the terminal portion of said main heating element and apertured to pass the terminal portion of said auxiliary heating element an amount limited by engagement with said abutment means, a sheet metal brace extending cross-wise of and secured to the loop-shaped active heating portion of said main heating element, and bendable wire means having a portion welded to and lying along said brace and a portion extending transversely of said brace and connected to the loop-shaped portion of said auxiliary heating element to oppose movement of said abutment means in a direction away from said plate member.

5. A heater construction for use with ovens which have heating element support surfaces at various positions, comprising a metal-sheathed tubular electric heating element having a pair of terminal portions in juxtaposed relation and an active heating portion of loop shape and including at least two spaced side portions, a support member extending crosswise of and rigidly secured to said terminal portions for supporting said heating element from an oven wall in cantilever fashion, a pair of sheet metal brace members extending cross-wise of said side portions and spaced from each other, each brace member having forked opposite ends and each forked end providing a recess for receiving a respective side portion and straddling legs which are deformed to retain said side portion in its recess, and a U-shaped ductile wire member for each of said side portions, each wire member having legs rigidly secured to paired ends of said brace members and a bight portion freely extending outwardly beyond the adjacent heating element side portion, said bight portion being adapted to be bent to a configuration corresponding to a support surface of a selected one of said ovens so that it may fit said support surface and cooperate therewith to relieve said support member of some of the supporting strain.

6. The construction according to claim 5 and further including a second metal-sheathed tubular electric heating element having a pair of terminal portions rigidly secured to said support member and an active heating portion of loop shape which is disposed in juxtaposed relation with respect to the loop shaped active heating portion of the first-named heating element, and means connecting the active heating portions of the two heating elements for mutual support.

References Cited in the file of this patent
UNITED STATES PATENTS

| | | |
|---|---|---|
| 1,307,198 | Harth | June 17, 1919 |
| 1,982,386 | Heinbuch | Nov. 27, 1934 |
| 2,137,149 | Tuttle | Nov. 15, 1938 |
| 2,180,600 | Mills | Nov. 21, 1939 |
| 2,498,583 | Schulze | Feb. 21, 1950 |
| 2,515,579 | Allen | July 18, 1950 |
| 2,824,204 | Reno et al. | Feb. 18, 1958 |
| 2,850,612 | Quirk | Sept. 2, 1958 |

FOREIGN PATENTS

| | | |
|---|---|---|
| 1,113,892 | France | Dec. 12, 1955 |